Patented Nov. 13, 1951

2,575,027

UNITED STATES PATENT OFFICE 2,575,027

N-SUBSTITUTED 4,6-DIAMINO METANILIC ACIDS

Willy A. Schmidt, Easton, Pa., and Vsevolod Tulagin, Phillipsburg, N. J., assignors to General Aniline & Film Corporation, New York, N. Y., a corporation of Delaware No Drawing. Application October 29, 1949, Serial No. 124,502

2 Claims. (Cl. 260—510)

The present invention relates to N-substituted 4,6-diamino metanilic acids in which the amino group in 4- position is substituted by an aliphatically linked sulfo or carboxy group.

One of the best known methods for forming dyestuff images in photographic elements involves that described in Fischer USP 1,102,028. The essentials of this method comprise the development of an exposed silver halide emulsion with a p-dialkylamino aniline developer in the presence of a color former to form in situ with the silver image azomethine or quinonimine dye images.

While these images are in general fairly satisfactory, they do suffer from the disadvantages of lack of stability to acids, alkalies, sulfur dioxide solutions and the like. They also have a tendency to fade after storage for a long period of time.

It has been proposed in the dyestuff art to utilize for the dyeing of textiles, compounds of the class known as phenyl phenazonium dyes. These products are produced by the reaction of a plurality of aromatic amines in the presence of air or an oxidizing agent such as chromic acid. Said compounds, which are typified by the following general structure in which K represents amino or OH radicals and X an acid radical,

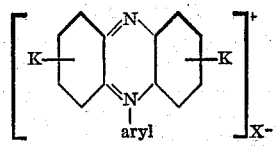

are very stable as compared to the quinonimine and azomethine dyes. They are, for instance, resistant to acids, alkalies, sulfur dioxide and dilute acid dichromate solutions. If it were possible to produce dyestuff images from such dyes by color development, the main objections to the Fischer process, to wit, lack of stability of the dyestuff images, would be removed.

We have now discovered that the more stable azine dye images rather than quinonimine or azomethine dye images are produced by developing an exposed silver halide emulsion in the presence of a color former with N-substituted 4,6-diamino metanilic acids in which the amino group in 4- position is substituted by an aliphatically linked carboxy or sulfo group.

These compounds are novel per se and they and their method of preparation constitute the purposes and objects of the present invention.

The N-substituted-4,6-diamino metanilic acid derivatives contemplated herein may be typified by the following structural formula:

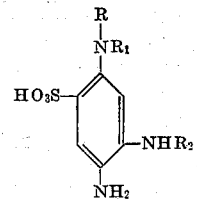

in which R is hydrogen or alkyl, i. e., methyl, ethyl, propyl, butyl, amyl or the like, R₁ is an aliphatic radical such as alkyl as above, carboxyalkyl, such as carboxymethyl, carboxyethyl, carboxypropyl, and the like, sulfoalkyl, such as sulfomethyl, sulfoethyl, sulfopropyl, sulfobutyl, and the like, or an aromatic radical of the benzene series such as phenyl, toluyl, carboxymethylphenyl, carboxyethylphenyl, carboxymethoxyphenyl, carboxyethoxyphenyl, hydroxymethylphenyl, hydroxyethylphenyl, hydroxymethoxyphenyl, hydroxyethoxyphenyl, and the like, and R₂ is sulfoalkyl or carboxyalkyl.

The following compounds which we have prepared by the method subsequently outlined are illustrative of the compounds within the above general formula:

1. 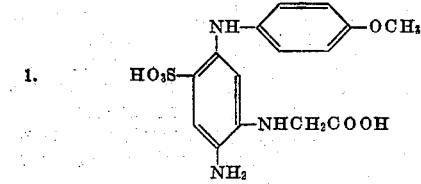

4-(carboxymethylamino)-6-(4'-methoxyphenylamino)-metanilic acid 2. 4 - (β - sulfoethylamino) - 6 - phenylamino-metanilic acid.

3. 4-(sulfomethylamino)-6-(N-methyl - phenylamino)-metanilic acid.

4. 4-(β-sulfoethylamino) - 6 - methylamino-metanilic acid.

5. 4-(β-sulfoethylamino)-6-(2'-carboxyphenylamino)-metanilic acid.

6. 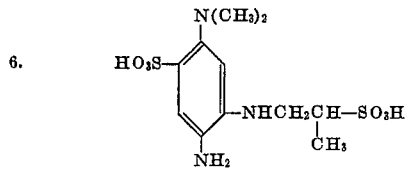

4-(β-methyl-β-sulfoethylamino)-6-dimethylamino-metanilic acid 7. 4-(α-methyl-carboxymethylamino)-6-ethylamino-metanilic acid.
8. 4-(β-sulfoethylamino)-6-(N-carboxymethyl-4'-methoxyphenylamino)-metanilic acid.
9. 4,6-di-(carboxymethylamino)-metanilic acid.
10. 4-(sulfomethylamino)-6-(4'-methylphenylamino)-metanilic acid.

11. 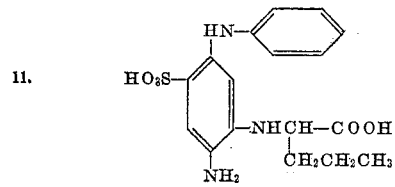

4-phenylamino-6-(α-propyl-carboxymethylamino)-metanilic

The aforementioned compounds are prepared by reacting in the proper sequence 2,4-dichloro-5-nitrobenzene sodium sulfonate with the amines desired to be introduced into the 2- and 4-positions of the benzene ring, and then effecting reduction of the nitro group to an amino group. The preparation of the compounds by the aforesaid method is made possible by the fact that the chlorine atom in the 4-position is more easily replaced by an amino group than the chlorine atom in 2-position. Thus by refluxing the 2,4-dichloro-5-nitrobenzene sodium sulfonate with an equivalent of an amine, the chlorine atom in 4-position is selectively replaced by such amine. By subsequently treating the resulting compound with the same or a different amine under more elevated temperatures, i. e., temperature ranging from 110 to 150° C., the chlorine atom in 2-position is replaced by the amine.

The following examples will serve to illustrate the invention but it is to be understood that the invention is not restricted thereto. The parts are by weight unless otherwise stated.

*Example I*

Into a 1-liter, 3-necked round-bottom flask equipped with a mechanical stirrer and a reflux condenser was placed 147 parts of the sodium salt of 2,4-dichloro-5-nitrobenzene sulfonic acid, 38 parts of aminoacetic acid and 54 parts of sodium carbonate dissolved in 250 parts of water. After the stirrer was started, the contents of the flask were gently refluxed for 10 hours. 240 parts of 30% sodium chloride solution were added to the hot reaction mixture and the flask was then cooled in an ice bath. The precipitated orange solid was collected by filtration, washed with a small amount of water, and dried overnight at 80–90° C.

A glass interliner for an Aminco shaking type bomb was charged with 96.1 parts of the 2-chloro-4-(carboxymethylamino)-5-nitrobenzene sodium sulfonate (prepared as above), 41 parts of 4-methoxyaniline, and 34 parts of sodium carbonate dissolved in 200 parts of water. The liner was sealed in the bomb and the bomb shaken at 140° C. for 15 hours. The bomb was cooled and the solid removed from the interliner with small amounts of hot water. 300 parts of 30% sodium chloride solution were added with vigorous stirring of the mixture and the whole was then cooled in an ice bath for several hours. The precipitated solid was collected by filtration, washed with 50 parts of water, and then digested with 200 parts of ethanol. The product was again collected on a filter and dried overnight at 60° C. in a vacuum oven.

10 parts of 2-(4'-methoxy-phenylamino)-4-(carboxymethylamino)-5-nitrobenzene sulfonic acid (prepared as above) were added portionwise to a boiling solution of 40 parts of sodium hydrosulfite in 222 parts of 10% sodium hydroxide. After reduction is complete, a small amount of decolorizing carbon is added to the solution. The mixture is boiled vigorously for several minutes and then filtered rapidly through a fluted filter. The compound was then isolated from the clear filtrate as the inner salt by acidification with glacial acetic acid. The mixture was cooled in an ice bath for several hours, the inner salt collected on a filter and washed with water. The product was then dried six hours at 65° C. in a vacuum oven and constituted the 4-(carboxymethylamino)-6-(4'-methoxyphenylamino)-metanilic acid.

*Example II*

The procedure is the same as in Example I excepting that the amino acetic acid is replaced by an equivalent amount of taurine and the 4-methoxyaniline by an equivalent amount of aniline.

The product obtained is 4-(β-sulfoethylamino)-6-phenylamino metanilic acid.

*Example III*

The procedure is the same as in Example I excepting that the amino acetic acid is replaced by an equivalent amount of taurine and the 4-methoxyaniline by an equivalent amount of methylamine.

The product obtained is 4-(β-sulfoethylamino)-6-methyl-amino metanilic acid.

*Example IV*

The procedure is the same as in Example I excepting that the amino acetic acid is replaced by an equivalent amount of β-methyl taurine and the 4-methoxyaniline by an equivalent amount of dimethylamine.

The product obtained is 4-(β-methyl-β-sulfoethylamino)-6-dimethylamino metanilic acid.

*Example V*

The procedure is the same as in Example I excepting that the 4-methoxyaniline is replaced by an equivalent amount of amino acetic acid.

The product obtained is 4,6-di-(carboxymethylamino)-metanilic acid.

It is to be expressly understood that by selection of the proper amines and their use as outlined in Example I, any of the products contemplated by the general formula and illustrated above can be readily formed.

The present application is a continuation-in-part of our application Serial No. 640,382, filed on January 10, 1946, now Patent Number 2,486,440, and entitled "Production of Phenazonium Dyestuff Images," and attention is directed to this application for examples illustrating the use of the metanilic acid derivatives in the production of azine dyestuff images.

Various modifications of the invention will oc-

We claim:
1. Compounds of the following general formula:

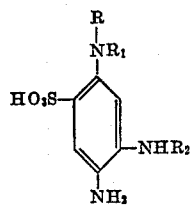

wherein R is selected from the class consisting of hydrogen and lower alkyl hydrocarbon, $R_1$ is selected from the class consisting of a lower aliphatic radical and a phenyl radical, and $R_2$ is selected from the class consisting of lower sulfoalkyl hydrocarbon and lower carboxyalkyl hydrocarbon.

2. 4-(carboxymethylamino) - 6 - (4'-methoxyphenylamino)-metanilic acid.

3. 4-(beta-sulfoethyl amino)-6-phenyl amino-metanilic acid.

4. 4-(sulfomethylamino) - 6 - (N-methyl-phenylamino)-metanilic acid.

5. 4-(beta-methyl-beta-sulfoethyl amino)-6-dimethyl amino-metanilic acid.

6. 4-(sulfomethylamino)-6-(4'-methyl phenylamino) metanilic acid.

WILLY A. SCHMIDT.
VSEVOLOD TULAGIN.

REFERENCES CITED

The following references are of record in the file of this patent:

UNITED STATES PATENTS

| Number | Name | Date |
|---|---|---|
| 2,163,166 | Wilmanns | June 20, 1939 |
| 2,414,491 | Tulagin | Jan. 21, 1947 |
| 2,486,440 | Schmidt | Nov. 1, 1949 |

FOREIGN PATENTS

| Number | Country | Date |
|---|---|---|
| 603,276 | Great Britain | June 11, 1948 |

OTHER REFERENCES

Beilstein, vol. XIV, p. 719.